United States Patent [19]

Kokeguchi

[11] Patent Number: 5,308,110
[45] Date of Patent: May 3, 1994

[54] STRUCTURE FOR MOUNTING AN AIR BAG TO A CONTAINER IN AN AIR BAG DEVICE FOR USE IN A PASSENGER SEAT

[75] Inventor: Akira Kokeguchi, Shiga, Japan
[73] Assignee: Takata Corporation, Tokyo, Japan
[21] Appl. No.: 990,254
[22] Filed: Dec. 14, 1992

[30] Foreign Application Priority Data

Jan. 6, 1992 [JP] Japan .................... 4-000256

[51] Int. Cl.⁵ .............. B60R 21/16; B60R 21/20
[52] U.S. Cl. .................. 280/728 A; 280/732
[58] Field of Search ........... 280/728 A, 728 R, 730 R, 280/732, 731, 743 R; 383/3; 220/404; 248/101, 99

[56] References Cited

U.S. PATENT DOCUMENTS

| | | | |
|---|---|---|---|
| 4,111,457 | 9/1978 | Kob et al. ............. | 280/728 A |
| 4,793,631 | 12/1988 | Takada ............. | 280/728 A |
| 4,986,569 | 1/1991 | Bruton ............. | 280/728 A |
| 5,087,067 | 2/1992 | Seki et al. | |
| 5,131,677 | 7/1992 | Horiuchi et al. | |
| 5,184,843 | 2/1993 | Berger ............. | 280/728 A |
| 5,186,492 | 2/1993 | Wright et al. ............. | 280/732 |

FOREIGN PATENT DOCUMENTS

| | | |
|---|---|---|
| 0364267 | 10/1989 | European Pat. Off. . |
| 0469734 | 7/1991 | European Pat. Off. . |
| 9014749 | 2/1991 | Fed. Rep. of Germany . |
| 1358364 | 11/1972 | United Kingdom . |

*Primary Examiner*—Karin L. Tyson
*Attorney, Agent, or Firm*—Kanesaka & Takeuchi

[57] ABSTRACT

An air bag device for use in a passenger seat comprises a box-shaped container opened at the front face, an air bag contained in a folded state in a container, a plate for seizing the edge along the opening of the air bag relative to the inlet of the container and a fixer for securing the plate to the container. The edge along the opening of air bag is turned back from the top end and stacked to each other. The top end of the turned back portion is stitched to the air bag, thereby forming a bore extended along the top end portion. A rod is inserted in the bore. The turned back and stacked portion is seized between the plate and the container. The bore is disposed along the seized portion.

5 Claims, 7 Drawing Sheets

STRUCTURE FOR MOUNTING AN AIR BAG TO A CONTAINER IN AN AIR BAG DEVICE FOR USE IN A PASSENGER SEAT

FIELD OF THE INVENTION

The present invention concerns an air bag device for use in a passenger seat disposed in a vehicle for extending an air bag upon collision of a vehicle thereby protecting a passenger. More, in particular, it relates to an improvement of a structure for mounting an air bag cloth to a container.

DESCRIPTION OF THE RELATED ART

Figure 5:
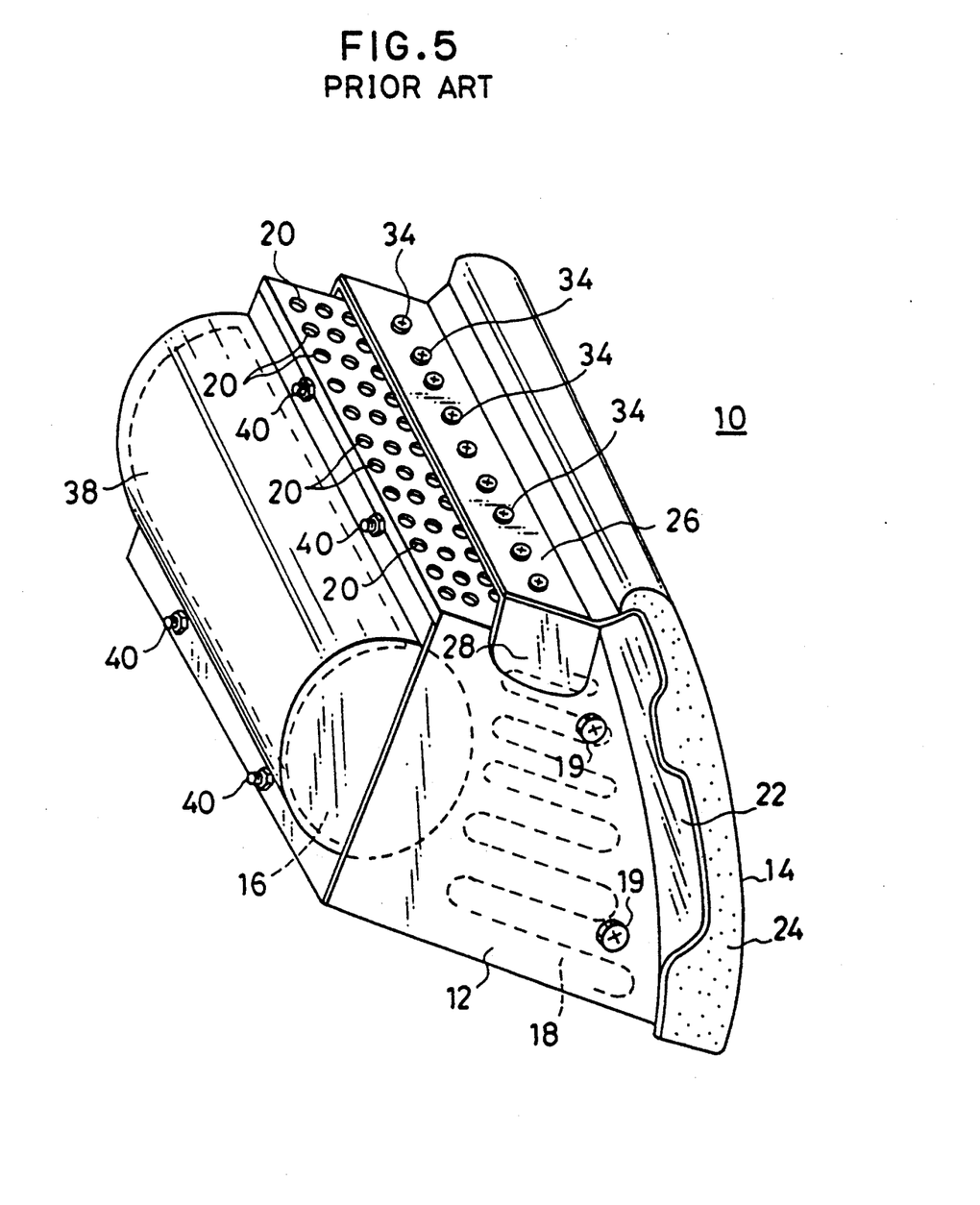
FIG. 5 is a perspective view of an air bag device for use in a passenger seat according to the present invention.
Figure 6:
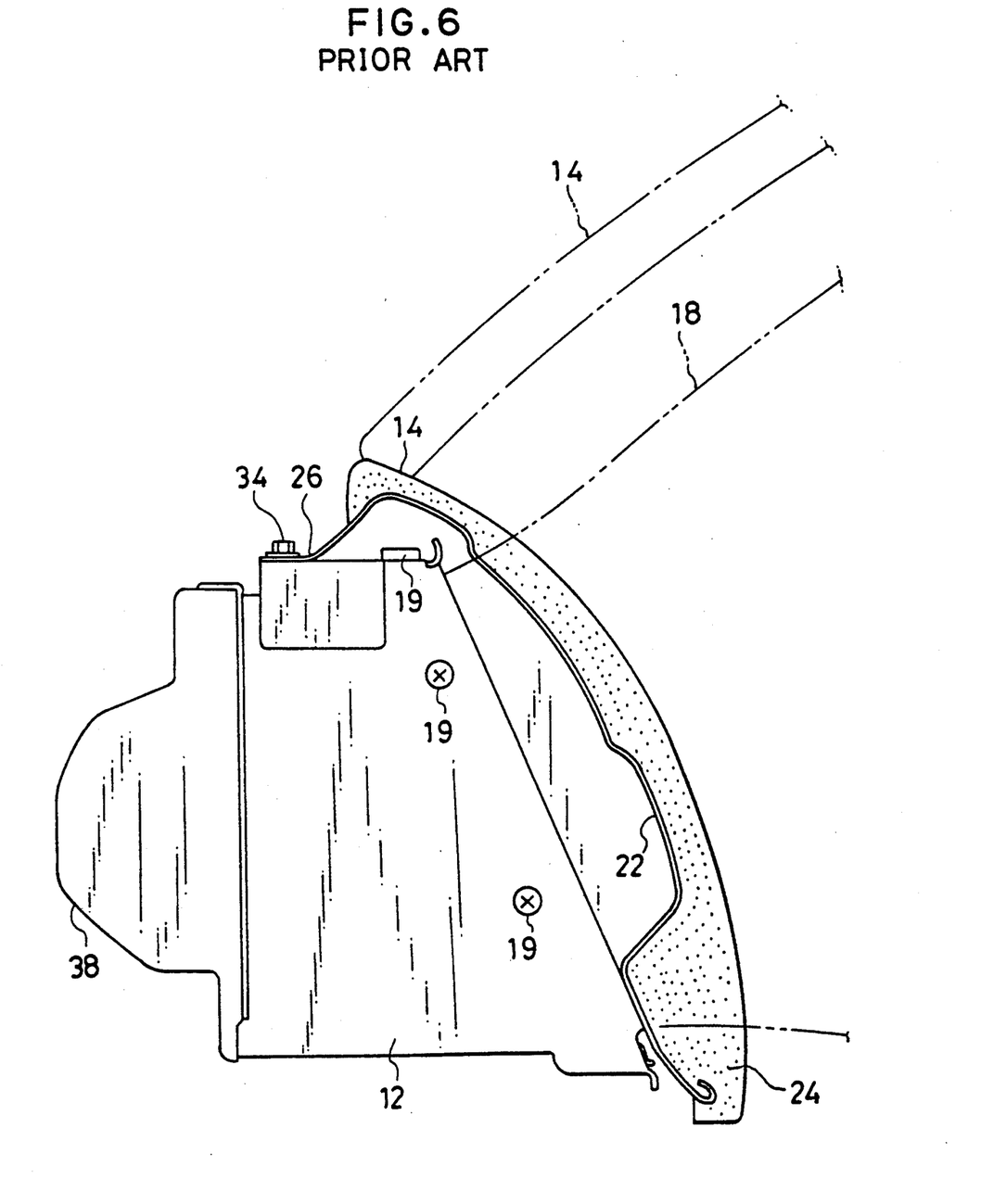
FIG. 6 is a side elevational view of an air bag device for use in a passenger seat according to the present invention.
Figure 7:
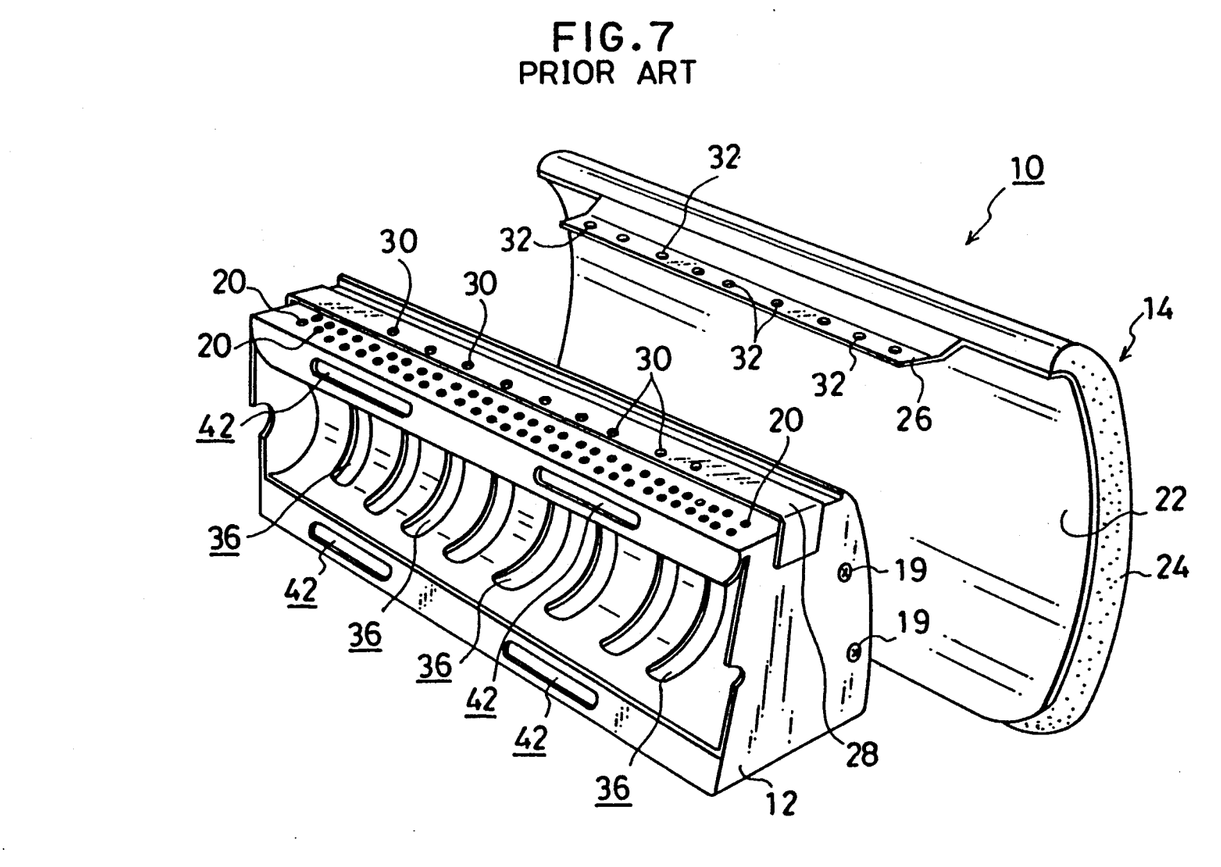
FIG. 7 is an exploded perspective view of an air bag device for use in a passenger seat according to the present invention.

In an air bag device for use in a passenger seat, a folded air bag and an inflator (gas generator) are mounted to a container and, further, a lid is mounted so as to cover the air bag. Upon collision of the vehicle, the inflator actuates to extend the air bag. The lid opens toward a cabin while being pushed by the extending air bag, so that the air bag extends largely toward the inside of the cabin to protect an occupant. FIGS. 5 through 7 show an existing air bag device for use in a passenger seat, in which FIG. 5 is a schematic perspective view illustrating the entire constitution of an air bag before extension, FIG. 6 is a side elevational view and FIG. 7 is an exploded perspective view.

In the air bag device 10, a cover 14 referred to as a lid is mounted to the front face of a box-shaped container 12 having an opening at the front face. An inflator 16 is secured to the container 12. An air bag 18 is inserted while being folded in the container 12 and secured by means of bolts 19.

A plurality of suction apertures 20 are perforated in the upper surface wall and the lower surface wall of the container 12 respectively. When the inflator 16 actuates and a gas is jetted out to the container 12, to extend the air bag 18, atmospheric air flows while passing through the suction apertures 20 into the container 12, so that the air bag 10 can be extended rapidly.

The lid 14 has a back up plate 22 made of an aluminum alloy or the like and a soft cover 24 disposed at the front face of the plate 22. The upper edge of the plate 22 constitutes a lid mounting portion 26 extended above the container 12.

A lid mount bracket 28 is secured to the upper surface of the container 12, for example, by spot welding. The lid mount bracket 28 is extended along the upper surface of the container 12 and has a plurality of bolt apertures 30 perforated therein. A plurality of bolt apertures 32 are also perforated in the lid mounting portion 26, and the lid mounting portion 26 is secured to the lid mount bracket 28 by means of bolts 34 and nuts.

As shown in FIG. 7, the container 12 is concaved at the back for receiving the inflator 16. Further, slits 36 are opened at the back for introducing a jetting gas from the inflator 16 into the container 12. The inflator 16 is held by an inflator cover 38 to the container 12. The inflator cover 38 is secured by means of bolts 40 to the container 12. A reference numeral 42 denotes openings for passing through the bolts 40.

When the inflator 16 jets out the gas into the container 12 and the air bag 18 starts inflation, the lid 14 opens so as to turn around upward and then the air bag 18 extends largely into the cabin.

Figure 8:
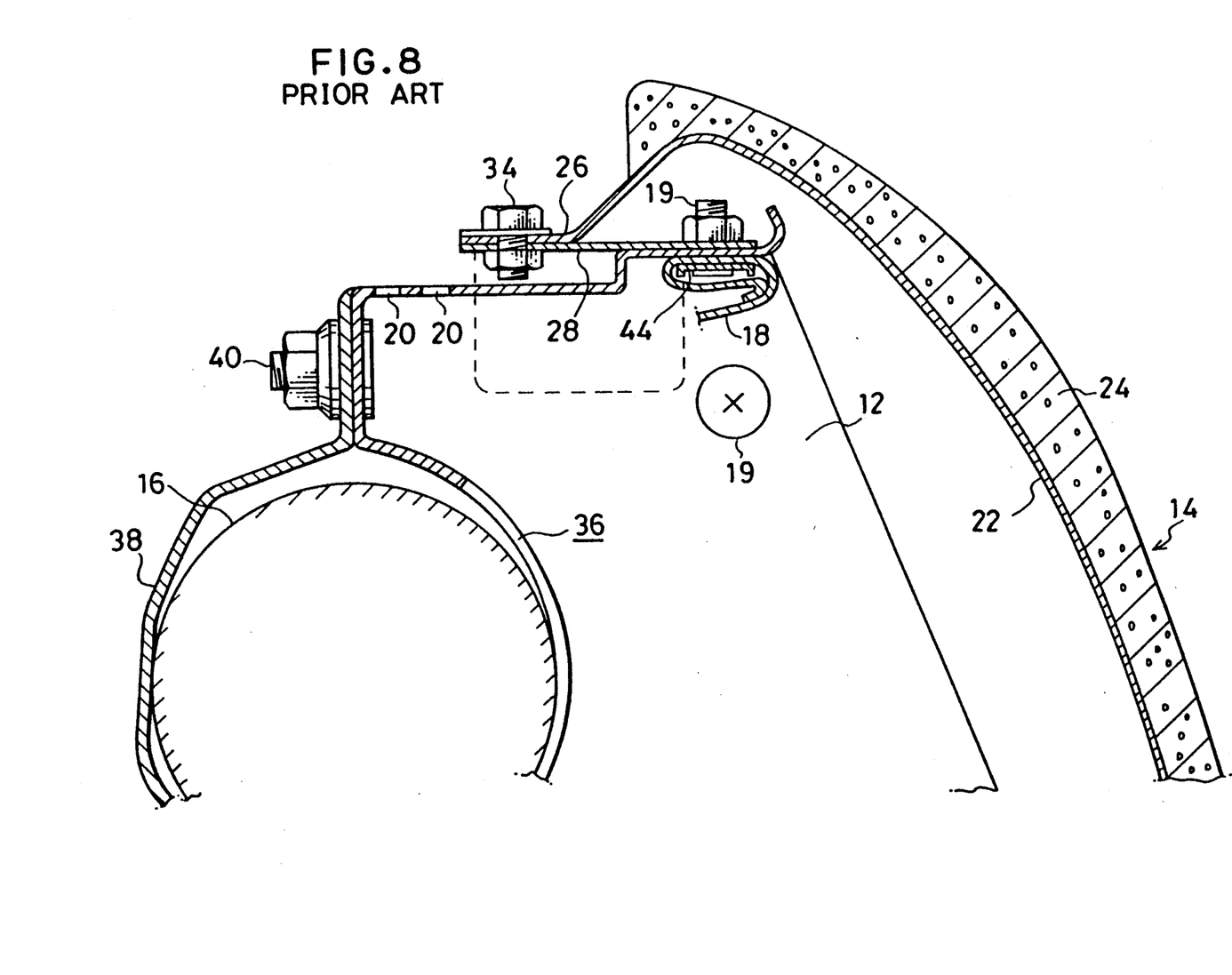
FIG. 8 is a cross sectional view illustrating a structure for mounting an air bag in the prior art and FIG. 9 is an enlarged cross sectional view illustrating a structure for mounting an air bag in the prior art.
Figure 9:
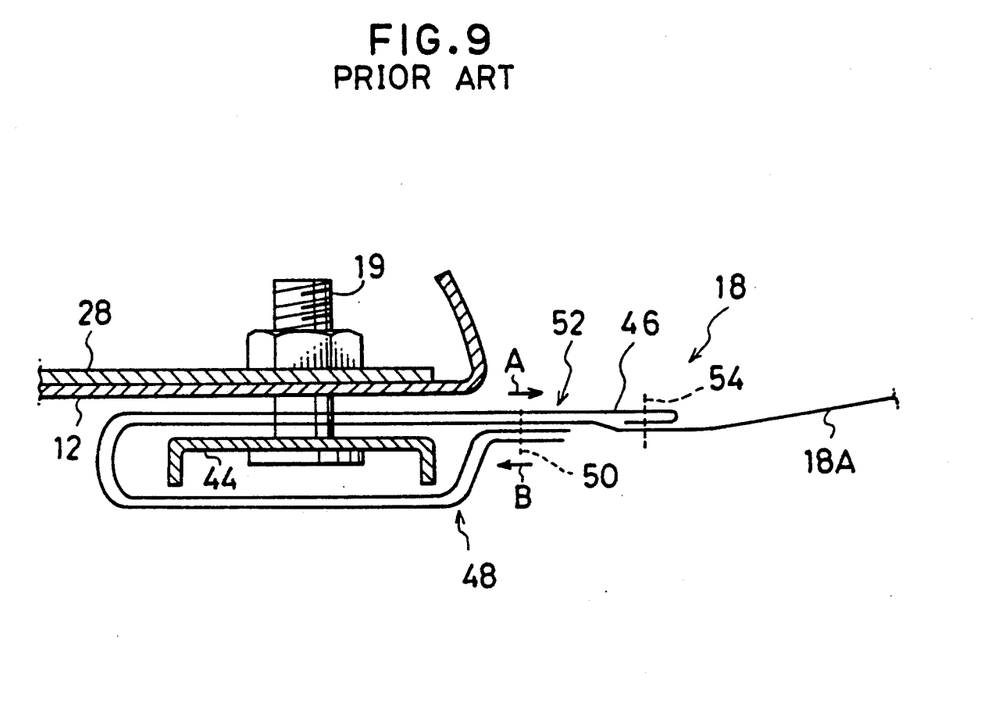

When the air bag extends as described above, since extremely large stresses are exerted on the mounting portion of the air bag 18, it is necessary that the air bag 18 is firmly mounted to the container 12 so as to effectively withstand the stresses. In order to satisfy such a requirement, the air bag 18 has been secured so far to the container 12 by using a plate 44 as shown in FIGS. 8 and 9. As shown in the figures, the plate 44 is secured to the inlet of the container 12 by bolts 19 (or rivet), so as to seize cloth at the edge along the opening of the air bag 18 by the plate 44. As shown schematically in an enlarged scale in FIG. 9, a reinforcing cloth 46 is stacked over a base cloth 18A of the air bag 18 and stitched thereto. The base cloth 18A and the reinforcing cloth 46 are put between the plate 44 and the container 12 (hereinafter referred to as a seized portion). The base cloth 18A and the reinforcing cloth 46 are turned back from each of their top ends, and the top ends 48 of the reinforcing cloth 46 and the base cloth 18A are stitched by a stitching thread 50 to an intermediate portion 52 of the base cloth 18A and the reinforcing cloth 46. A reference numeral 54 denotes a stitching thread for the reinforcing cloth 46 and the base cloth 18A.

In FIG. 9, each of the cloths is shown by a solid line for showing the constitution clearer. Further, a gap is shown between each of the cloths, and between each of the container and plate and so on but they actually contact to each other.

When the air bag 18 extends, the air bag 18 is intensely pulled forward (rightward in FIG. 9), by which the top end 48 is intensely pulled leftward as shown by arrow and B in FIG. 9, while the intermediate portion 52 is pulled intensely rightward. Accordingly, an extremely large force is exerted along the shearing direction to the stitching thread 50 and the cloth in the vicinity thereof. Therefore, for effectively resisting the strong external force in the shearing direction, it has been necessary to make the stitching by the thread 50 extremely strong, which has made the stitching operation remarkably laborious.

OBJECT AND SUMMARY OF THE INVENTION

An object of the present invention is to provide an air bag device for use in a passenger seat requiring no strong stitching as described above and capable of simply assembling the air bag device.

Another object of the present invention is to provide a structure for mounting an air bag to a container in an air bag device for use in a passenger seat capable of firmly supporting the air bag to the container.

In the first aspect of the present invention, a structure for mounting an air bag to a container in an air bag device for use in a passenger seat comprises a box-shaped container opened at the front face, an air bag contained in a folded state in a container, a plate for seizing the edge along the opening of the air bag relative to the inlet of the container and a metal member for securing the plate to the container.

The edge along the opening of the air bag is turned back from the top end and stacked to each other. The top end of the turned back portion is stitched to the air bag, thereby forming a cylindrical bore extended along the top end portion. A rod is inserted in the bore to bulge the bag-shaped portion. The turned back and stacked portion is seized between the plate and the container. The bore is disposed along the seized portion, by which the bore is inhibited from intruding into the seized portion.

In the second aspect of the present invention, a structure for mounting an air bag to a container in an air bag device for use in a passenger seat comprises a box-shaped container opened at the front face, an air bag contained in a folded state in a container, a plate for seizing the edge along the opening of the air bag relative to the inlet of the container and a metal member for securing the plate to the container.

The edge along the opening of the air bag is turned back from the top end and stacked to each other. The top end of the turned back portion is stitched to the air bag by means of a thread. The stitching thread used for stitching constitutes a protrusion protruding out of the cloth substrate. The turned back and stacked portion is seized between the plate and the container. A bag-shaped portion is disposed along the seized portion, by which the protrusion composed of the thread is inhibited from intruding into the seized portion.

In the third aspect of the present invention, a structure for mounting an air bag to a container in an air bag device for use in a passenger seat as defined by the first or second aspect, the reinforcing cloth is stacked over the cloth at the edge of the opening of the air bag, and the reinforcing cloth is stitched to the cloth at the edge along the opening of the air bag in each of the stitched portions.

In the fourth aspect of the present invention, a structure for mounting an air bag to a container in an air bag device for use in a passenger seat as defined by any one of the first to third aspects, wherein the front edge of the plate is protruded ahead of the front edge of the inlet of the container, and the front edge of the plate is bent back so as to surround the turned back portion of the air bag.

In the structure for mounting the air bag to a container in the air bag device for use in the passenger seat in the first aspect of the present invention, when the air bag is pulled forward, upon extension of the air bag, the rod abuts against the seized portion, thereby inhibiting the air bag cloth from drawing out of the seized portion. Further, the tensile stress exerted on the air bag base cloth exerts in an identical direction to all of cloth substrates. As a result, the shearing stress to the stitched portion of the substrate is extremely reduced, so that it is possible to reduce the stitching strength required for the portion in which the air bag cloth are stitched to each other near the seized portion.

In the structure for mounting the air bag to the container in the air bag device for use in the assistant seat, when the air bag is pulled forward strongly upon extension, the protrusion composed of the stitching thread in the turned back portion of the air bag abuts against the seized portion, thereby inhibiting the air bag cloth from drawing out of the seized portion. Further, the tensile stress applied to the air bag base cloth exerted in the same direction to all of cloth substrates. As a result, the shearing stress is exerted on the stitched portion of the cloth substrate can be reduced, by which it is possible to reduce the stitching strength required for a portion in which air bag cloths are stitched to each other near the sized portion.

In the structure for mounting the air bag to the container in the air bag device for use in the passenger seat according to the third aspect, the substrate or base cloth of the air bag is reinforced by the reinforcing cloth to increase the mounting strength of the air bag to the container.

In the structure for mounting the air bag to the container in the air bag device for use in the passenger seat according to the fourth aspect, since the front edge of the plate surrounds the turned back portion of the air bag cloth, the turned back portion can be protected. Further, by bending back the front edge of the plate, the cross sectional secondary coefficient of the plate can be increased to improve the bending rigidity of the plate.

PREFERRED EMBODIMENTS

Description will now be made to preferred embodiments according to the present invention with reference to the drawings.

Figure 1:
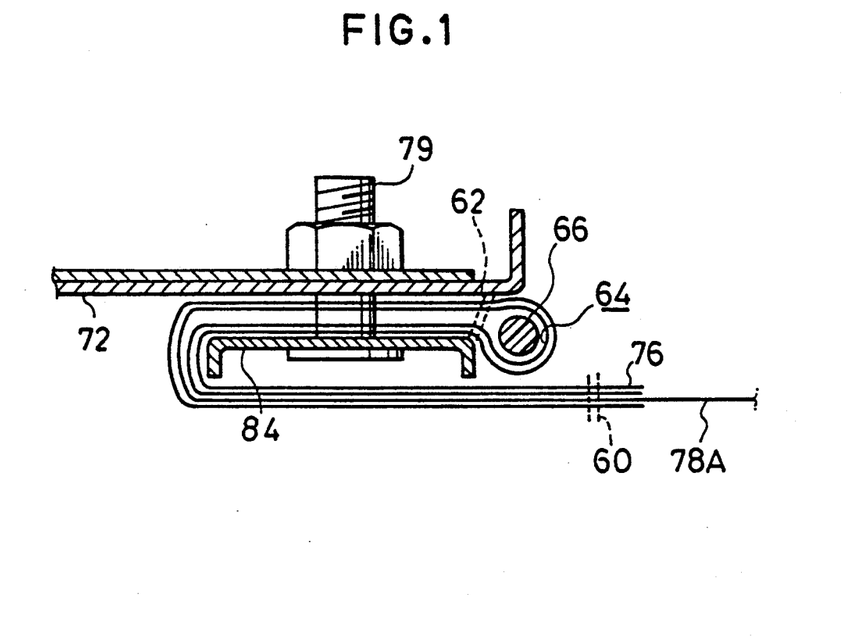
FIG. 1 is a cross sectional view illustrating a structure for mounting an air bag in a preferred embodiment according to the present invention.

FIG. 1 is a cross sectional view illustrating a structure for mounting an air bag in a preferred embodiment according to the present invention, which shows the cross section for the same portion as that in FIG. 9 illustrating the prior art as described above.

A portion of an air bag base cloth 78A that is attached to a container 72 (that is a edge along the opening of an air bag) is stacked with a reinforcing cloth 76 and stitched by mean of stitching threads 62. In this embodiment, the top end of the air bag back base cloth 78A is turned bag and a reinforcing cloth 76 is attached so as to cover the turned back portion from the outside. The stitching thread 62 stitches the air bag 73A and the reinforcing cloth 76 so as to bind the turned back portion of the air bag cloth 78A and the reinforcing cloth 76, by which a cylindrical bore 64 is formed at the turned back portion of the air bag base cloth 78A and the reinforcing cloth 76. A rod 66 is inserted in the bore 64.

A portion comprising four cloth sheets and located between the stitching threads 62 and 60 is put between a plate 84 and the container 72 and tightly secured by means of a bolt 79. In the structure for mounting the air bag, when a force is applied to the air bag base cloth 78A in the direction of drawing out the seized portion upon extension of the air bag, since the rod 66 abuts against the seized portion, the air bag 78A is surely inhibited from drawing out of the seized portion. Further, the tensile stress applied to the air bag to base cloth 78A is exerted in the same direction to all of the portions also including the reinforcing cloth 76.

Accordingly, the shearing stress exerted on the portion of the stitching threads 60 and 62 is extremely reduced to make it possible to reduce the stitching threads 60 and 62. Accordingly, the stitching labor with the stitching threads 60 and 62 can be facilitated to improve the operation efficiency for the stitching.

Figure 2:
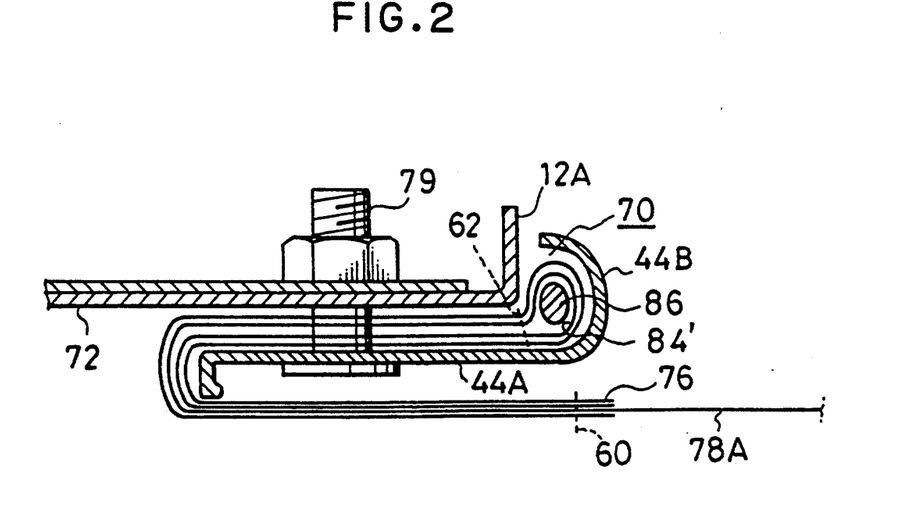
FIG. 2 is a cross sectional view illustrating a structure for mounting an air bag in another preferred embodiment according to the present invention.

FIG. 2 is a cross sectional view illustrating a structure for mounting an air bag according to a further embodiment of the present invention. In this embodiment, a plate 44A having a curved portion 44B is used instead of the plate 84. The curved portion 44B turns around further ahead of a flange 12A at the top end of the container 72 to form a space 70 between the curved portion and the flange 12A. Then, the bag-shaped portion in which a rod 86 is inserted is housed in the space 70. The portions and components as those in FIG. 1 carry the same reference numerals.

Also in this embodiment, the same function and effect as those in the embodiment shown in FIG. 1 can be provided. Further, in this embodiment, since the bag-shaped portion 84' is covered by the curved portion 44B, the bag-shaped portion 84' can be protected. Accordingly, friction between the lid or the like of the air bag device and the bag-shaped portion 84' can be inhibited, so that the durability of the bag-shaped portion 64 can be enhanced. Further, the bending rigidity of the plate 44A is large.

Figure 3:
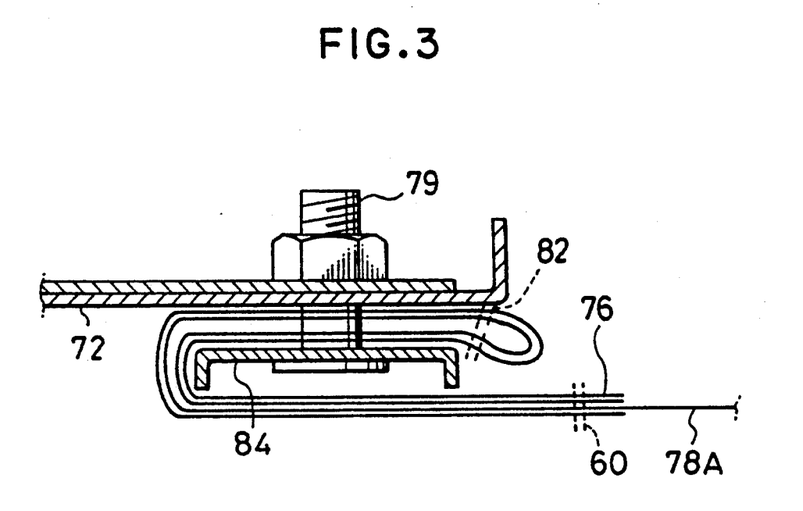
FIG. 3 is a cross sectional view illustrating a structure for mounting an air bag in a further preferred embodiment according to the present invention.

FIG. 3 is a cross sectional view illustrating a structure for mounting an air bag in a further embodiment of the present invention. In this embodiment, the rod 66 is saved and, instead, seams of a stitching thread 82 protrudes considerably from the cloth substrate. Abutment of the protrusion of the stitching thread 82 against the seized portion between the plate 84 and the container 72 inhibits the air bag base cloth 78A from drawing out upon extension of the air bag. Further, also in the same way as in the previous embodiments, the tensile stress applied to the air bag base cloth 78A upon expansion of the air bag is exerted in the same direction to all of portions including the reinforcing cloth 76. Accordingly, the shearing stress in the portions of the stitching threads 60 and 82 is extremely reduced, making it possible to reduce the required stitching strength by the stitching threads 60 and 62.

Figure 4:
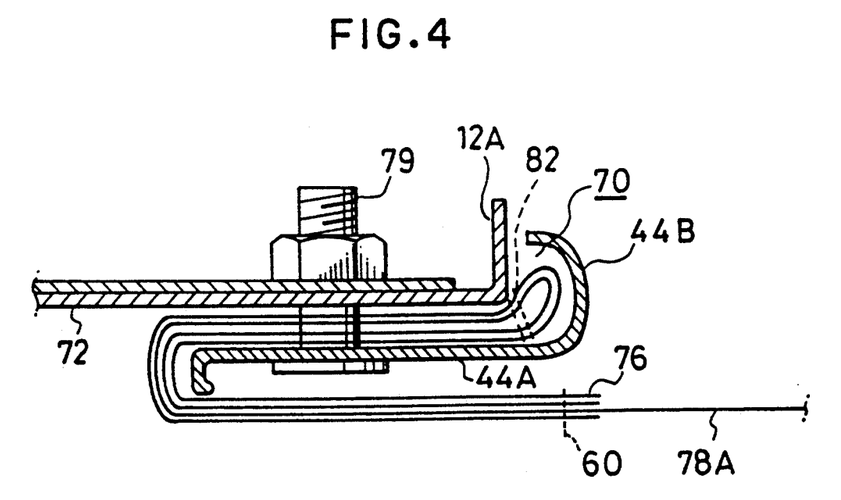
FIG. 4 is a cross sectional view illustrating a structure for mounting an air bag in a still further preferred embodiment according to the present invention.

FIG. 4 is a cross sectional view illustrating a structure for mounting an air bag in a still further embodiment according to the present invention, in which the plate 84 shown in FIG. 3 is replaced with a plate 44A. Also in this embodiment, since the turned back portion near the stitching thread 82 is covered by a curved portion 44B, the cloth substrate at that portion can be protected. In FIG. 4, same portions and components as those in FIG. 2 carry the same reference numerals.

In each of the embodiments shown in FIG. 1 through FIG. 4, the reinforcing cloth is stacked over the air bag base cloth and the attaching strength and the durability of the air bag base cloth are improved extremely.

The bolts 79 are used in the above-mentioned embodiment but it will be apparent that various kinds of retaining metals such as rivets may also be used.

As has been described above in the structure for mounting the air bag according to the present invention, the air bag base cloth can surely be prevented from drawing out of the sized portion upon extension of the air bag. Further, since the shearing stress applied to the stitching portion of the air base cloth or the reinforcing cloth is extremely decreased, the stitching strength can be reduced. Accordingly, stitching labor for the air bag base cloth or reinforcing cloth can be facilitated.

According to the present invention, the air bag base cloth can be reinforced sufficiently by the reinforcing cloth.

According to the present invention, the turned back portion of the air bag base cloth and the reinforcing cloth can be protected, to thereby enhance the durability of the air bag.

What is claimed is:

1. A structure for mounting an air bag to a container in a passenger seat, comprising:
    a rectangular container having an inlet opened at a front face thereof, a side wall to define the inlet, and a flange extending perpendicularly outwardly from the side wall to surround the inlet,
    an air bag folded and retained in the container, said air bag having an opening to receive gas from an inflator, an edge portion extending along the opening, and a turned back portion turned back for a predetermined length from the edge portion,
    a reinforcing cloth folded to retain the turned back portion and a part of the air bag corresponding to the turned back portion, said reinforcing cloth and the air bag being stitched together at a first stitch near an end of the turned back portion away from the edge portion and at a second stitch near the edge portion of the air bag so that a cylindrical bore is formed at the edge portion,
    a rod inserted in the bore to bulge at the edge portion,
    a plate fixed only to the container at an inner side around the inlet thereof, said plate having at one side thereof an inner flange extending in a direction away from the side wall of the container and at the other side thereof a curved portion extending outwardly from the inlet and turning back to a portion near the flange of the container to have a space between the curved portion and the flange, and
    securing means for securing the plate to the container so that when the air bag is attached to the container, almost half of the turned back portion is seized between the plate and the container while the edge portion with the rod therein is located in the space between the curved portion and the flange to prevent movement of the edge of the air bag, a remaining half of the turned back portion not held by the plate turning around the inner flange of the plate and extending near the curved portion to thereby securely fix the air bag to the container.

2. A structure according to claim 1, wherein said rod has an oval cross section.

3. A structure according to claim 2, wherein said securing means are bolts with nuts, said bolts passing through the plate, container, air bag and reinforcing cloth to integrally connect together.

4. A structure for mounting an air bag to a container in a passenger seat, comprising:
    a rectangular container having an inlet opened at a front face thereof, a side wall to define the inlet, and a flange extending perpendicularly outwardly from the side wall to surround the inlet,
    an air bag folded and retained in the container, said air bag having an opening to receive gas from an inflator, an edge portion extending along the opening, a turned back portion turned back for a predetermined length from the edge portion,
    a reinforcing cloth folded to retain the turned back portion and a part of the air bag corresponding to the turned back portion, said reinforcing cloth and the air bag being stitched together at a first stitch near an end of the turned back portion away from the edge portion and at a second stitch near the edge portion of the air bag, a thread for the second stitch protruding outwardly from a surface of the reinforcing cloth, a plate fixed only to the container at an inner side around the inlet, said plate having at one side thereof an inner flange extending in a direction away from the side wall of the container and at the other side thereof a curved portion extending outwardly from the inlet and turning back to a portion near the flange of the container to have a space between the curved portion and the flange, and securing means for securing the plate to the container so that when the air bag is attached to the container, almost half of the turned back portion is seized between the plate and the container while the protruded second stitch at the edge portion is located in the space between the curved portion and the flange to prevent sliding movement of the air bag into a portion between the plate and the container, a remaining half of the turned back portion not held by the plate turning around the inner flange of the plate and extending near the curved portion to thereby securely fix the air bag to the container.

5. A structure according to claim 4, wherein said securing means are bolts with nuts, said bolts passing through the plate, container, air bag and reinforcing cloth to securely connect together.

* * * * *